United States Patent [19]
O'Ryan

[11] Patent Number: 5,902,478
[45] Date of Patent: May 11, 1999

[54] FILTER ANTI-ROTATION DEVICE

[75] Inventor: Adam O'Ryan, Fayetteville, N.C.

[73] Assignee: Advanced Performance Technology, Inc., Lugoff, S.C.

[21] Appl. No.: 08/799,191

[22] Filed: Feb. 12, 1997

[51] Int. Cl.$^6$ ................................................ B01D 27/08
[52] U.S. Cl. ................... 210/232; 210/443; 210/DIG. 17
[58] Field of Search .................................. 210/232, 440, 210/443, 444, DIG. 17, 450; 220/319, 619, 640, 649

[56] References Cited

U.S. PATENT DOCUMENTS

| | | | |
|---|---|---|---|
| Re. 33,744 | 11/1991 | Oetiker | 24/20 |
| 2,277,738 | 3/1942 | Wilkinson . | |
| 2,647,636 | 8/1953 | Rafferty . | |
| 3,347,386 | 10/1967 | Kraissl, Jr. . | |
| 3,352,955 | 11/1967 | Pigot et al. | 264/135 |
| 3,628,451 | 12/1971 | McClellan et al. | 101/4 |
| 3,804,258 | 4/1974 | Okuniewski et al. | 210/460 |
| 3,912,633 | 10/1975 | Delaney . | |
| 3,944,317 | 3/1976 | Oberdiear | 339/143 |
| 4,106,659 | 8/1978 | Dent et al. | 220/619 |
| 4,169,058 | 9/1979 | Pickett et al. | 210/DIG. 17 |
| 4,237,015 | 12/1980 | Fearnhead | 210/DIG. 17 |
| 4,237,584 | 12/1980 | Oetiker | 24/23 |
| 4,372,458 | 2/1983 | Carlson | 220/649 |
| 4,404,483 | 9/1983 | Lebkuchner | 310/42 |
| 4,492,004 | 1/1985 | Oetiker | 24/20 |
| 4,614,398 | 9/1986 | Wright et al. | 339/143 |
| 4,624,185 | 11/1986 | Emerson | 102/293 |
| 4,643,699 | 2/1987 | Taig | 464/112 |
| 4,740,299 | 4/1988 | Popoff et al. . | |
| 4,795,572 | 1/1989 | La Valley . | |
| 4,807,351 | 2/1989 | Berg et al. | 29/432 |
| 4,956,089 | 9/1990 | Hurst . | |
| 4,992,166 | 2/1991 | Lowsky et al. . | |
| 5,039,406 | 8/1991 | Whittington . | |
| 5,238,717 | 8/1993 | Boylan . | |
| 5,291,863 | 3/1994 | Jones . | |
| 5,744,032 | 4/1998 | Kemper | 210/443 |

OTHER PUBLICATIONS

Brochure for Maxwell Laboratories "Magneform offers new dimensions in shaping and assembling metals." 10 pages (date unknown).

Brochure for Magneform 7000 Series equipment. 6 pages; 1978.

*Primary Examiner*—Matthew O. Savage
*Attorney, Agent, or Firm*—Staas & Halsey

[57] ABSTRACT

An aviation filter including an injection molded plastic ring that is formed with only a slight clearance relative to the outer diameter of the cylindrical metal filter. The ring includes an inner circumferential lip that snaps into a recess formed in a rolled seam on an end of the filter, and secured via an adhesive. The ring includes holes that receive a wire connected to corresponding tie downs formed on the mount. A method of manufacturing an aviation filter includes the steps of snapping the plastic lock ring into place on the filter, and using an adhesive to hold the ring in place against rotation.

61 Claims, 5 Drawing Sheets

FILTER ANTI-ROTATION DEVICE

BACKGROUND OF THE INVENTION

1. Field of the Invention

This invention relates to filters and, more particularly, to an anti-rotation device for a replaceable, spin-on type of oil filter particularly suited for use on an aircraft.

2. Background Art

For certain uses of a filter or pressure vessel, added assurance may be needed that same will remain intact, such as where the filter will experience excessive vibration. For example, airplane spin-on oil filters experience vibration and require special precautions to prevent the filter from spinning off or otherwise becoming loose. Should the filter become loose, oil could leak, oil pressure could drop and the engine could suffer catastrophic damage, resulting in a very dangerous situation. To prevent this dangerous situation, aviation filters are required by federal regulations to accept an additional lock or safety wire extending between the filter and the filter mount.

One effort to address this requirement has included welding a metal member to the closed or "dome" end of a cylindrical metal filter. The metal member has four spaced tabs, each including a hole therein. See, e.g., FIG. 1 of U.S. Pat. No. 4,992,166. The holes receive a wire (or wires) that extends through tie downs attached to the mount, and the wire ends are tied off. By using this wire lock, rotation of the filter, and the resultant leakage, should be prevented. Also, the costs associated with this welding procedure are relatively reasonable, especially when compared with other prior art procedures described below.

A drawback associated with this structure is that the welding requires extra steps in filter manufacture. That is, the metal member must be separately formed and welded to the dome end of the otherwise complete filter. As the metal member must be welded, there is always the possibility that the welding process can perforate the housing, violating the integrity of the housing. This causes defects during manufacture or worse, a dangerous situation while in use. Also, if the weld becomes unstable in use, a dangerous condition can result.

Alternatively, the filter housing can be molded entirely of plastic and tabs molded integrally to project from the dome end of the filter to receive the wires. See e.g., FIG. 10 of U.S. Pat. No. 4,992,166.

The following drawbacks may be associated with this all plastic design. Molding the entire housing of plastic requires a relatively expensive mold. Dropping the filter could lead to breakage of the integral, projecting tabs.

Also, the above-referenced attempts at providing a reliable aviation filter lock down mechanism use holes located at the dome of the filter. The distance from the dome to the tie downs on the mount, however, is rather long, perhaps resulting is some rotation nonetheless, which might cause oil leakage, depending upon the quality of the gasket and its installation relative to the filter and the mount.

Still another way to provide an aviation filter lock down is to form a ring out of aluminum material, and connect the ring to the "open" end of a cylindrical metal filter housing using electromagnetic forces. This process is known as "Magneform," which is believed to be a trademark of Gulf General Atomic Inc. of San Diego, Calif. More particularly, the ring is formed with very close tolerances and, under electromagnetic forces, is fit onto the filter: the ring effectively shrinks to take the shape of the filter housing open end outer diameter. The fit is so tight that the ring does not rotate, thereby preventing rotation of the filter when the filter is mounted, and a wire is extended through holes formed in the ring.

Drawbacks to this Magneform approach include the need for expensive electromagnetic equipment, possible exposure of employees on the assembly line to dangerous electromagnetic radiation, high material costs, and the overall manufacturing/assembly process is somewhat complicated, slow and expensive. Further, because aluminum is relatively soft, there may be a tendency for the wire to begin cutting through the holes formed in the aluminum ring with extended use, thereby causing a dangerous condition.

As can be seen, the prior art still does not provide the most cost-effective, reliable, and easy to manufacture anti-rotation device for a pressure vessel or filter.

SUMMARY OF THE INVENTION

Accordingly, it is a purpose of the present invention to provide a pressure vessel or filter anti-rotation device that is simpler in design, more reliable, and easier and more cost-efficient to make.

It is another purpose of the present invention to provide a spin-on filter that is safer and less expensive to make than like, known filters.

It is another purpose of the present invention to provide an aviation filter including a lock ring that is lighter, of less mass, and is easier and less costly to make and assemble on a metal filter housing.

It is another purpose of the present invention to provide an aviation filter lock ring that requires no specialized equipment for manufacturing, and poses no special safety issues.

It is another purpose of the present invention to provide an aviation filter having a plastic lock ring that cooperatively attaches to the filter housing open end.

It is still another purpose of the present invention to provide a plastic lock ring of superior strength that reliably and easily receives a wire attached to the filter mount.

It is another purpose of the present invention to provide a lock ring which is not susceptible to the wire cutting through the material of the ring.

It is still another purpose of the present invention to provide a cost-effective, weldless method for producing an anti-rotation device for a vessel.

It is another purpose of the present invention to provide a method for manufacturing an aviation filter with a lock ring that is easier, safer and less expensive than prior art methods.

To achieve the foregoing and other purposes of the present invention there is provided a filter for non-rotational receipt on a filter mount. The filter includes an injection molded plastic ring that is formed with only a slight clearance relative to the outer diameter of the filter housing. The ring includes an inner circumferential lip that snaps into a recess formed in a rolled seam on an end of the filter, and is secured via an adhesive. The ring includes a set of four spaced holes that receives a wire connected to corresponding tie downs formed on the mount.

The present invention also provides a method of manufacturing a filter including the steps of snapping the plastic lock ring into place on the filter seam, and further using an adhesive to hold the ring in place against rotation.

These inventions eliminate the prior art expensive electromagnetic equipment, and related dangerous electromagnetic radiation for employees on the assembly line, reduce costs since plastic is less expensive than aluminum, avoid the problem of the wire cutting into the soft aluminum, and reduce manufacturing/assembly costs. The inventions also provide a more cost-effective and reliable anti-rotational device for a fluid filter. Further, these inventions eliminate welding and the possible housing penetration related thereto.

BRIEF DESCRIPTION OF THE DRAWINGS

The accompanying drawings, which are incorporated in and constitute a part of the specification, illustrate embodiments of the invention and, together with the description, serve to explain the principles of the invention.

DESCRIPTION OF THE PREFERRED EMBODIMENTS

The preferred embodiments of the present invention will now be described in greater detail with reference to FIGS. 1–8.

While the preferred embodiments of the present invention are described below in regard to aviation filter applications having peculiar anti-rotation or safety needs, the present invention is intended for a reliable solution to fuel or oil filters, hydraulic and other pressure vessels, expansion chambers, or any application requiring added safety, or those subjected to excessive vibration situations.

Figure 1:
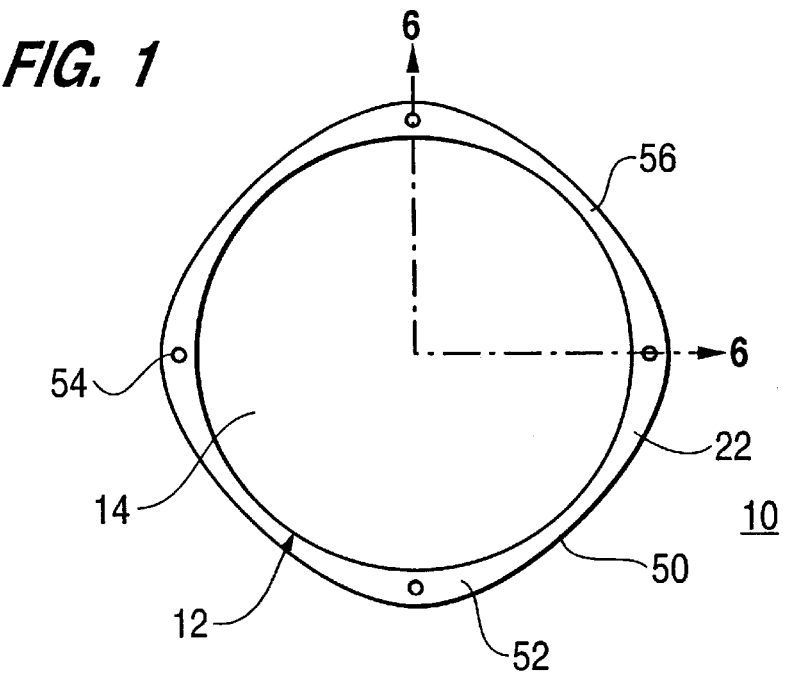
FIG. 1 is a top view of a filter according to a preferred embodiment of the present invention.

As shown in FIG. 1, which is a top view, the preferred embodiment of the present invention is a filter 10, which aside from the configuration of one end, is a relatively conventional, spin-on type. As such, this filter 10 removes impurities from oil circulating in an engine and, is most particularly suited for use as an aviation filter, or any other application where significant vibrations are experienced.

The filter 10 includes a filter housing 12 that is cylindrical and preferably formed of drawn metal. The housing 12 has a first, closed or "dome" end 14 and a second, "open" end 16. By open, it is meant that when drawn, the housing includes an opening to its interior. Of course, when the filter 10 is being assembled, this open end 16 of the housing 12 is mostly closed off by the end plate 26 and gasket retainer 24 described below.

Figure 2:
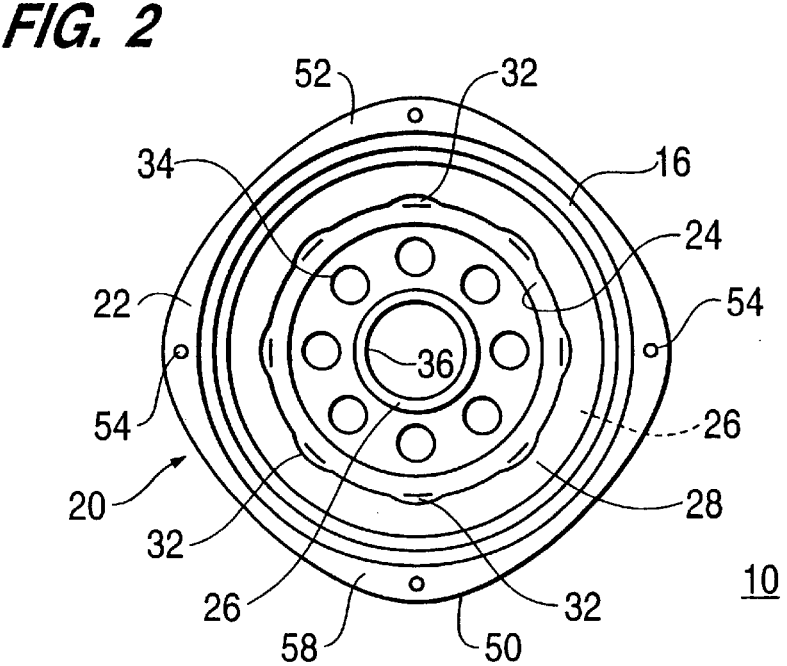
FIG. 2 is a bottom view of the filter shown in FIG. 1.

FIG. 2 shows the bottom 20 of the filter 10, which corresponds to the second end 16 of the filter housing 12. The bottom 20 includes, radially inward, a lock ring 22 described in greater detail below, the second end 16 of the housing 12, a metal gasket retainer 24 welded to a thick metal end plate 26, and a gasket 28 received in the gasket retainer 24.

The gasket 28 is, in the preferred embodiment, an 80±5 Durometer Nitrile 2523 compound, with the mount sealing surface 30 (FIGS. 6 and 7) of the gasket 28 being angled downwardly, as desired, to improve sealing. The outer diameter of the gasket 28 is about 2.6 inches. The gasket retainer 24 includes radially spaced crimping 32 to facilitate holding the gasket 28 in the gasket retainer 24.

Continuing with the bottom 20 of the filter 10, radially inward, there is included a plurality of inlet holes 34, formed in corresponding manner in the gasket retainer 24 and the end plate 26, and an outlet 36 formed in the center of the end plate 26. The outlet 36 is threaded 38 (FIGS. 6 and 7) to allow a conventional spin on attachment of the filter 10 to a threaded stud 86 on a filter mount 40 (FIG. 8).

Figure 3:
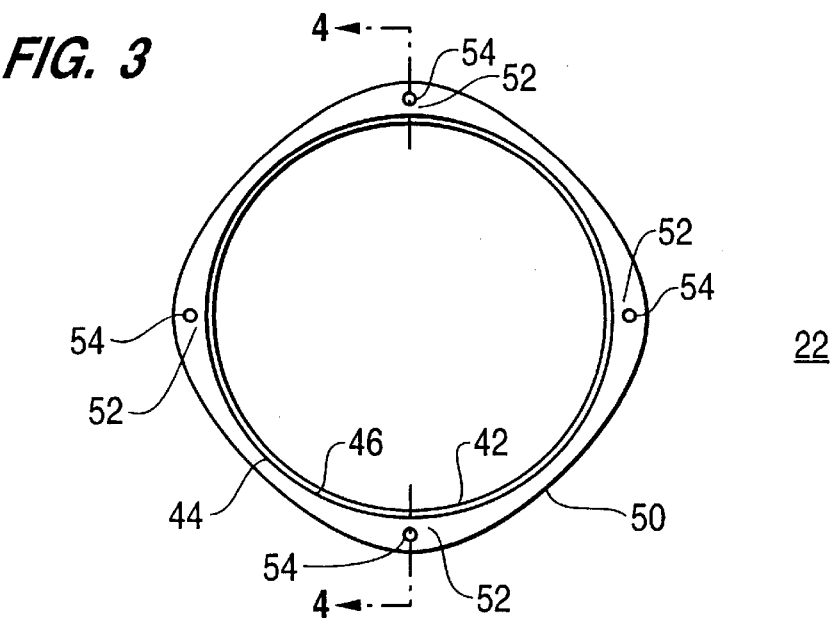
FIG. 3 is a top view of a lock ring according to the preferred embodiment of the present invention.
Figure 4:
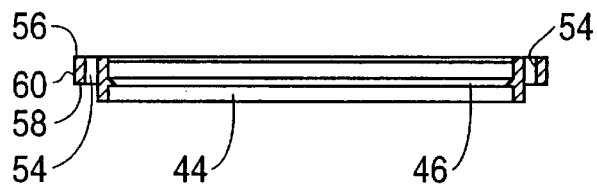
FIG. 4 is a side, cross-sectional view of the lock ring, taken along lines 4—4 of FIG. 3.

FIG. 3 is a top view of the lock ring 22 according to the present invention, and FIG. 4 is a side, cross-sectional view thereof taken along line 4—4 of FIG. 3. This lock ring 22 is preferably made of ABS (acrylonitrile butadiene styrene resin) plastic, and most preferably is injection molded of a plastic material sold commercially under the name of Capron™. Capron is a trademark for a product sold by Allied-Signal.

The lock ring 22 includes a circular opening 42 which receives the filter housing 12 circumference. The circular opening is formed by an inner wall 44 which includes, about halfway up its height, a projecting lip 46 which cooperates with a seam 48 formed at the housing 12 second end 16, as described below.

The lock ring 22 also includes, as best seen in FIG. 3, a four sided outer perimeter 50 forming four equally spaced projecting portions 52. In each projecting portion 52, there is formed a cylindrical hole 54 which serves to receive a wire 84 (FIG. 8) to lock the filter 10 on the filter mount 40 against rotation, as described below. The holes 54 extend from a top 56 of the ring 22 to a bottom 58 of a flange 60 extending outwardly from the ring 22.

Of course, other geometrical shapes for the lock ring 22 can be used, e.g. three or five projecting portions, with corresponding numbers of holes 54 for receiving the wires 84, or merely a circular ring. Other geometrical parameters are contemplated for the ring and housing combination, e.g., a rectangular ring for cooperating with a rectangular vessel, an oval ring for an oval vessel, etc.

In addition to the benefits described herein for the present invention, the plastic ring is lighter and has less mass than the prior art aluminum ring. In an aviation context, less weight and mass are beneficial, allowing improved fuel and space efficiency, and performance.

Figure 5:
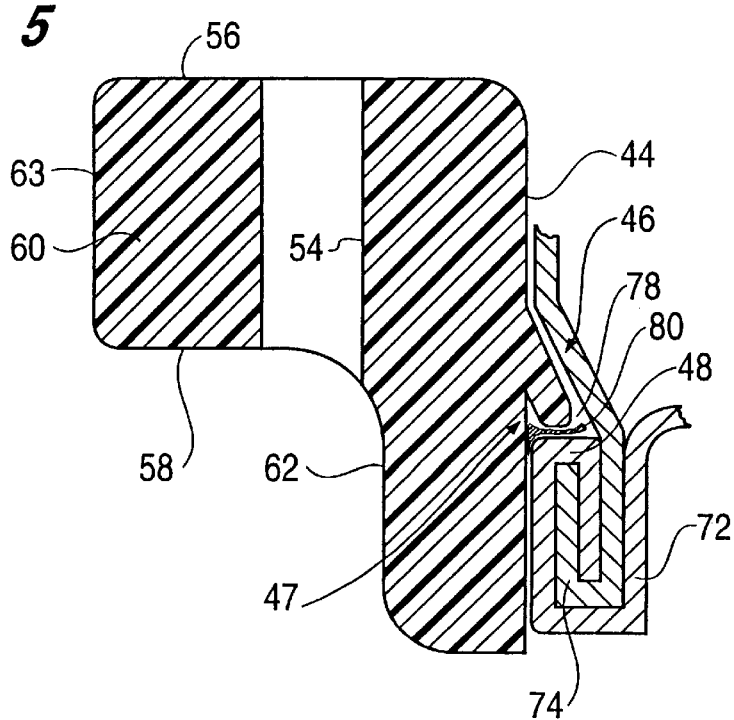
FIG. 5 is a side, cross-sectional view of the cooperation between the ring and the filter seam.

In FIGS. 4 and 5, the projecting lip 46 is seen extending circumferentially along the inner wall 44. The projecting lip 46 extends downwardly at an angle of about 65 degrees. The lock ring 22 also includes an outer wall 62, below and recessed from the flange 60.

While certain dimensions are provided below, it is to be understood that same are merely for illustrative purposes, as fluid filters can be made in many sizes depending upon the filtering capacity, use, etc.

The outer diameter of the lock ring 22 at an outer 63 periphery of the flange 60 is about 3.5 inches. The distance from a central axis of one hole 54 to a central axis of an opposing hole 54 is about 3.233 inches. The diameter of each hole 54 is about 0.060 inch. The inner diameter of the lock ring 22, at the inner wall 44, is about 2.980 inches. The inner diameter at the lip 46, however, is about 2.920. The diameter of the outer wall 62 is about 3.141 inches. The height of the lock ring 22 is about 0.360 inches. The height of the flange 60 is about 0.172 inches.

Figure 6:
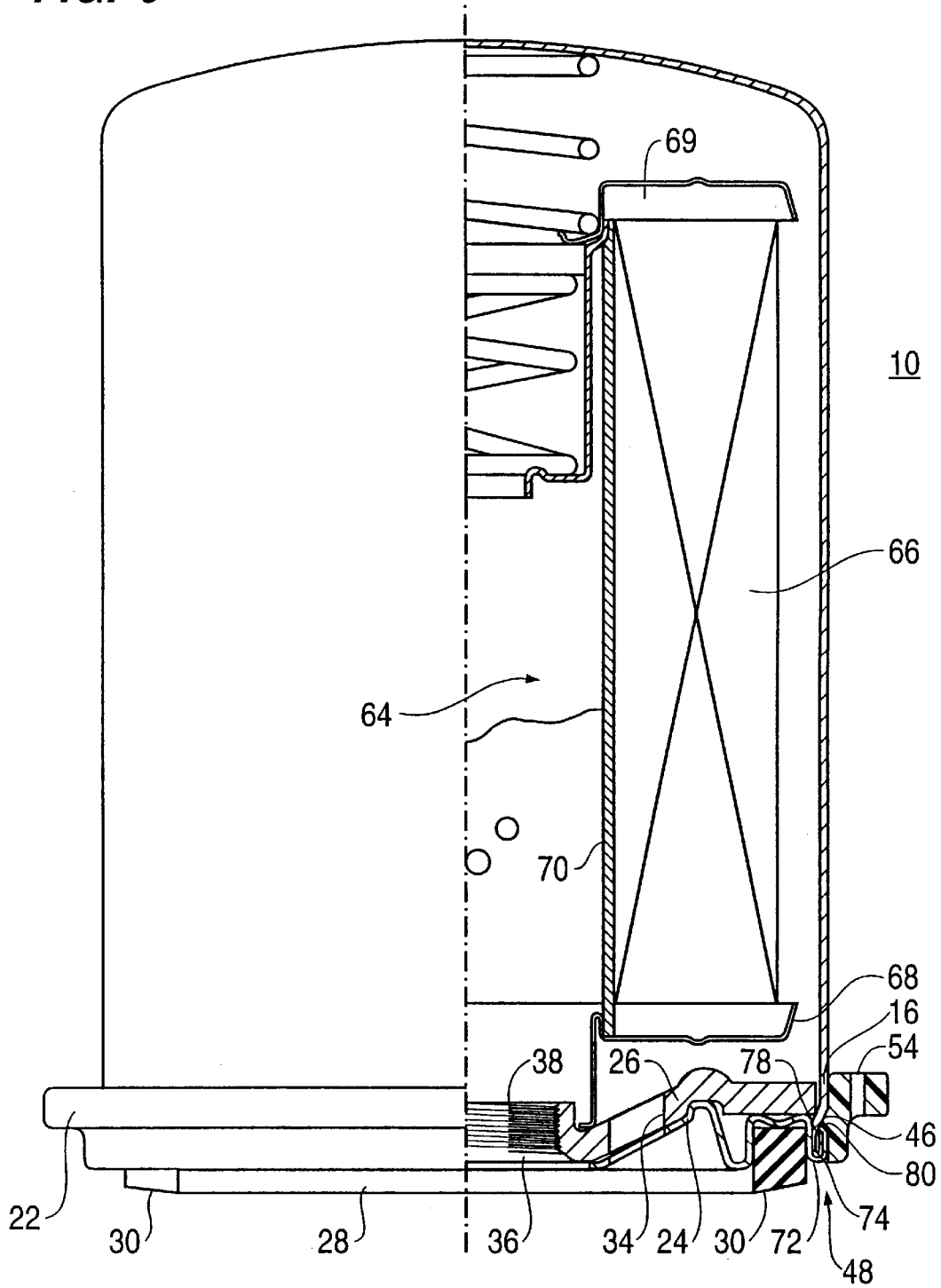
FIG. 6 is a cross-section of a portion of the filter, taken along line 6—6 of FIG. 1.
Figure 7:
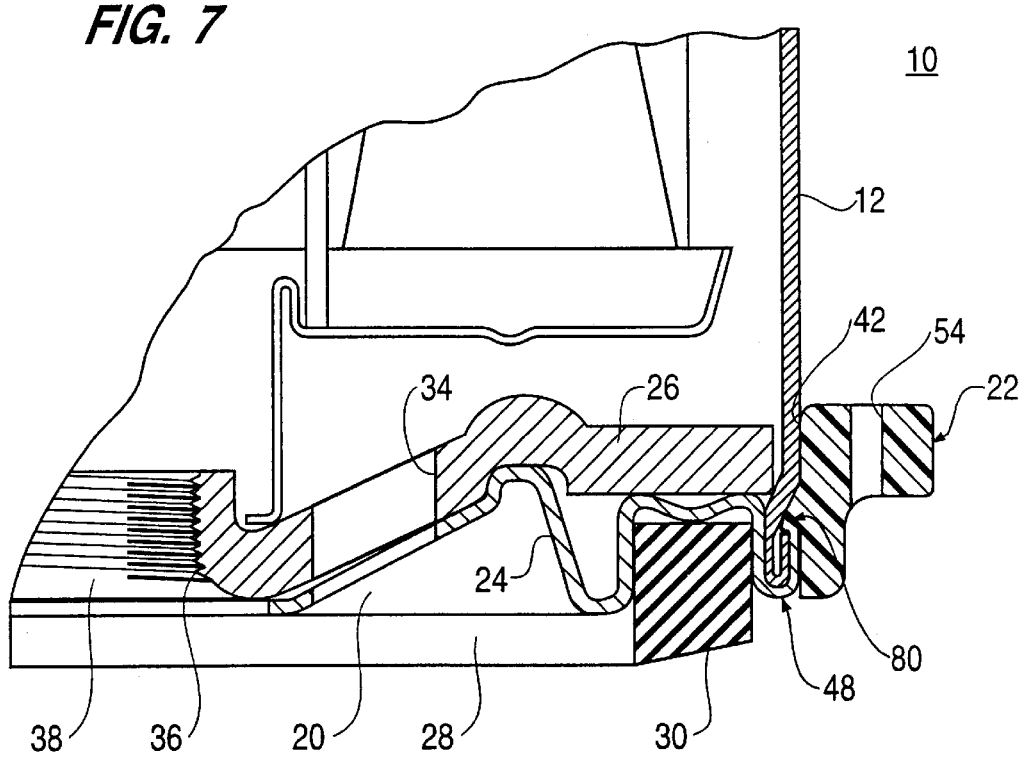
FIG. 7 is an enlarged view of the cross-sectional portion shown in FIG. 6.
Figure 8:
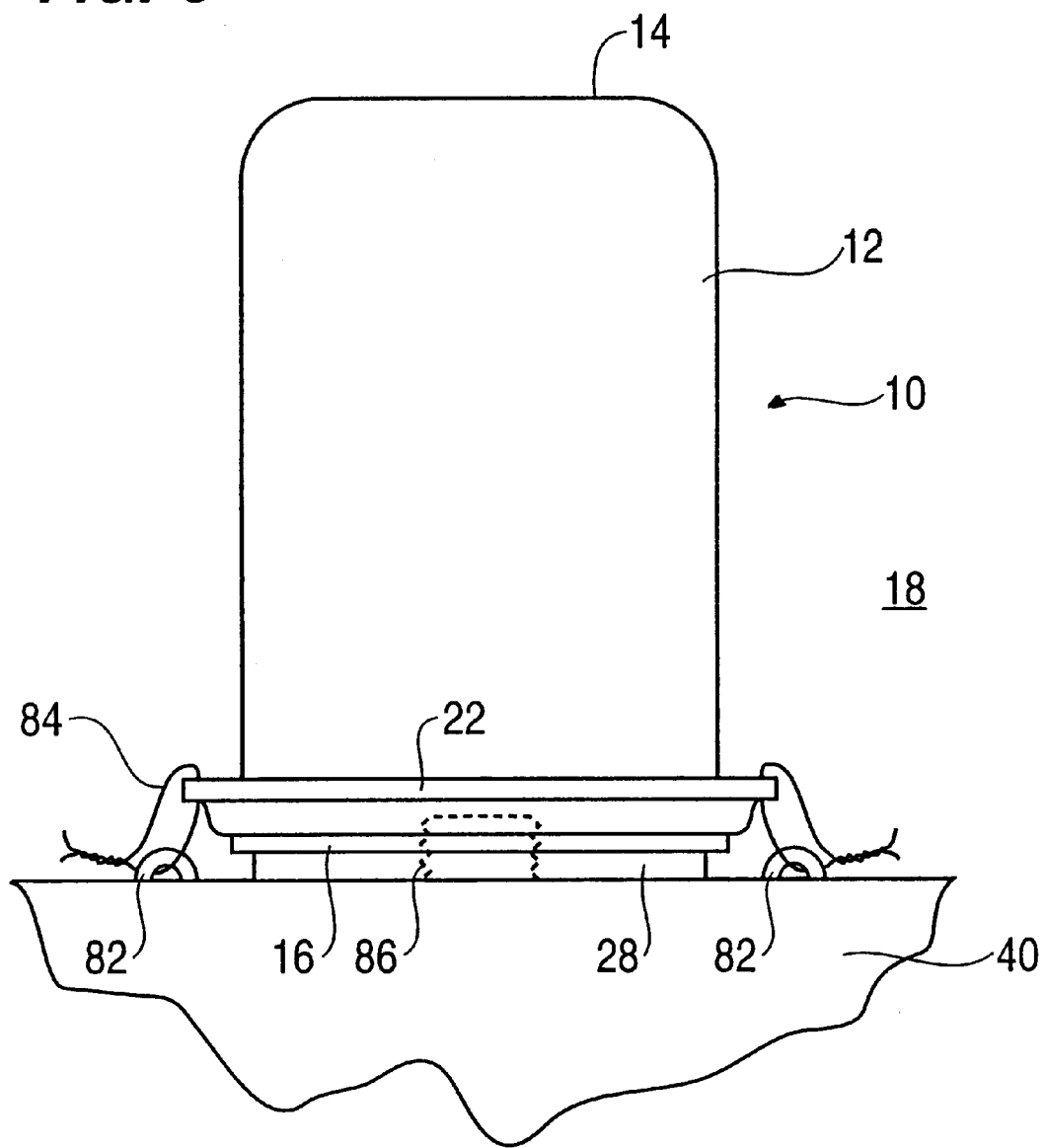
FIG. 8 is a side elevational view of the filter according to the preferred embodiment of the present invention attached to a filter mount.

FIG. 6 is a side, cross-sectional view of a portion of the filter 10 shown in FIG. 1, and FIG. 7 is an enlargement of the ring 22/seam 48 cooperation. As can be seen, the filter 10 includes the gasket 28, received by the gasket retainer 24, and the end plate 26. The end plate 26, as noted above, is threaded 38 to allow the filter 10 to be spun on and off a conventional threaded filter mount 40 stud 86. Within the filter 10, there is a filter element 64 including a cylindrical filter media 66, usually paper, bordered by a lower end cap 68, and an upper end cap 69, as well known in the industry. The end caps are usually made of metal. Further, there is located in the filter 10, within the cylindrical media 66, a center tube 70, also usually made of metal.

As seen in FIGS. 5–7, an outer edge 72 of the gasket retainer 24, and a free end 74 of the housing second end 16 are rolled together to form the seam 48. The seam 48 includes an external recess 78 which receives the projecting lip 46, as described below. Further, a structural adhesive 80, which is capable of forming a bond between plastic and metal, is used between the projecting lip 46 and the recess 78. See, e.g., U.S. Pat. No. 4,740,299. In the preferred embodiment, the adhesive 80 is known by the commercial name "E-32." which is a two part, non-flexing epoxy sold by the Permabond Company.

FIG. 8 illustrates a filter assembly 18, wherein the filter 10 described above is spun on a stud 86 of a filter mount 40 with the gasket 28 compressed between the gasket retainer 24 of the filter 10 and the filter mount 40. The stud 86 can either be an integral part of the mount 40, such as machined and welded, or can be a separate adaptor type stud with opposing threaded portions to cooperate with a threaded receptacle on the mount 40, and the threaded portion 38 of the filter 10. Of course, by using the separate adaptor, threads of different pitch and circumference can be accomodated.

The mount 40 is formed to include a plurality of conventional tie-downs 82 to receive a corresponding wire or wires 84 that extend through the holes 54, and the free ends are then tied. In this way, the filter 10 is prevented from rotation at a point closest to the point where the rotation would occur. In the prior art devices, where a wire tie down would be located on the dome of the filter, as shown in U.S. Pat. No. 4,992,166, there was significant distance between the top of the filter and the filter mount, and the filter could rotate to a greater extent than is possible with the present invention.

The method invention includes the following steps. First, the gasket retainer 24 is affixed to the end plate 26, usually by conventional welding. Then, the outer edge 72 of the gasket retainer 24 is rolled with the free end 74 of the filter housing 12, the filter 10 already having been loaded with the filter element 64. Adhesive 80 is then placed in a receptacle 47 formed under the lip 46. The lock ring 22 is then pushed onto the filter 10 from the dome end 14 of the filter 10 to the second end 16.

The inner diameter of the ring 22, about 2.920 inches, is slightly less than the outer diameter of the filter housing 12 about, 2.97 inches. Accordingly, as the ring 22 is placed over the filter housing 12 there is some resistance. However, when the ring 22 arrives at the recess 78 formed at the rolled seam 48, the lip 46 of the ring 22 merely snaps into place in the recess 78, as shown in FIG. 5. The adhesive creates a permanent bond between the ring 22 and the filter 10.

The lip 46 is not then capable of being removed from the recess 78, especially after the adhesive 80 bonds. The ring 22 is prevented from movement both along the longitudinal axis of the filter housing 12, and from rotation relative to the circumference of the filter housing 12. The gasket 28 can be added anytime, and is sometimes inserted into the gasket retainer 24 by the consumer.

These inventions eliminate the need for special, expensive electromagnetic equipment, and the dangerous electromagnetic radiation for employees on the assembly line. These inventions also reduce costs since plastic is less expensive than aluminum, avoid the problem of the wire cutting into the soft aluminum, reduce overall manufacturing/assembly costs, avoid the welding step that could cause loss of housing integrity, use a single part connected to a vessel serving as a fixture, do not require secondary applications, require low investment costs, provide an anti-rotation device that is placed optimally from a safety standpoint, and result in a lower per unit cost than the prior art discussed above.

The foregoing is considered illustrative only of the principles of the invention. Further, since numerous modifications and changes will readily occur to those skilled in the art, it is not desired to limit the invention to the exact construction and operation shown and described. Accordingly, all suitable modifications and equivalents may be resorted to that fall within the scope of the invention and the appended claims.

What is claimed is:

1. A filter, comprising:
   a housing having a side wall, a first closed end and a second open end, an end plate for closing the second open end, a filter element disposed within the housing for filtering fluid, a plastic lock ring attached to an exterior of the second, open end via a structural adhesive, wherein said lock ring includes a hole for receiving a wire extending from a filter mount to the filter to lock the filter against rotation relative to the mount, and formed in the end plate, a plurality of inlet holes, and an outlet hole that is threaded to allow a conventional spin on attachment of the filter to a threaded stud on the filter mount.

2. The filter as recited in claim 1, wherein the plastic lock ring is injection molded.

3. The filter as recited in claim 1, wherein the plastic is an acrylonitrile butadiene styrene resin.

4. The filter as recited in claim 1, wherein the lock ring comprises:
   a circular opening which corresponds to a circular cross-section of the second end of the filter.

5. The filter as recited in claim 4, wherein the circular opening of the ring is formed by an inner wall including a projecting lip which cooperates with a seam formed on the filter second end.

6. The filter as recited in claim 5, wherein the lock ring further comprises an outer perimeter including equally spaced projecting portions, in each projecting portion of which there is formed a hole which serves to receive a wire extending from a filter mount to the filter to lock the filter against rotation relative to the mount.

7. The filter as recited in claim 4, wherein the ring includes a plurality of holes extending from one surface of the ring to another surface of the ring for receiving respective wires extending from a filter mount to the filter to lock the filter against rotation relative to the mount, and a projecting lip extending circumferentially along an inner wall forming the circular opening.

8. The filter as recited in claim 7, wherein the filter further comprises a gasket retainer connected to the end plate, and wherein an outer edge of the gasket retainer and a free end of the filter housing form a rolled seam which receives the projecting lip of the ring.

9. The filter as recited in claim 8, wherein said structural adhesive is disposed between the projecting lip and the rolled seam.

10. The filter as recited in claim 8, further comprising a gasket in the gasket retainer.

11. A spin-on filter assembly, comprising:
   a. a filter having a housing with a side wall, a first, closed end and a second open end, wherein the second end includes a plastic lock ring including a plurality of holes and being attached to an exterior of the second end via a structural adhesive, an end plate for closing the second open end, and, formed in the end plate, a plurality of inlet holes and an outlet hole that is threaded; and
   b. a filter mount including a threaded stud which cooperates with the threaded outlet hole, and a plurality of tie downs to receive a wire that extends through each hole in the ring to lock the filter against rotation relative to the mount.

12. A filter comprising:
   a cylindrical housing having a first, closed end and a second open end, a filter element disposed within the housing for filtering fluid, an injection molded plastic lock ring attached to an exterior of the second end via a structural adhesive, wherein said lock ring includes a hole for receiving a wire extending from a filter mount to the filter to lock the filter against rotation relative to the mount, an end plate for closing the second open end, a gasket retainer fixed to the end plate, wherein the end plate includes a plurality of inlet holes and an outlet hole that is threaded to allow a conventional spin on attachment of the filter to a threaded stud on the filter mount.

13. The filter as recited in claim 12, wherein the plastic is an acrylonitrile butadiene styrene resin.

14. The filter as recited in claim 12, wherein the lock ring comprises:
   a circular opening which corresponds to a circular cross-section of the second end of the housing.

15. The filter as recited in claim 14, wherein the circular opening of the ring is formed by an inner wall including a projecting lip which cooperates with a seam formed at the housing second end.

16. The filter as recited in claim 15, wherein the lock ring further comprises an outer perimeter including equally spaced projecting portions, in each projecting portion of which there is formed a hole which serves to receive a wire extending from a filter mount to the filter to lock the filter against rotation relative to the mount.

17. The filter as recited in claim 14, wherein the ring includes a plurality of holes extending from one surface of the ring to another surface of the ring for receiving respective wires extending from a filter mount to the filter to lock the filter against rotation relative to the mount, and a protecting lip extending circumferentially along an inner wall forming the circular opening.

18. The filter as recited in claim 17, wherein an outer edge of the gasket retainer, and the second end of the housing form a rolled seam which receives the projecting lip of the ring.

19. The filter as recited in claim 18, wherein said structural adhesive is disposed between the projecting lip and the rolled seam.

20. A filter, comprising:
   a housing, having a first, closed end and a second, open end, a filter element disposed in the housing for filtering fluid, an injection molded plastic lock ring having a projecting lip for attachment to an exterior of the second open end, wherein said lock ring includes a hole for receiving a wire extending from a filter mount to the filter to lock the filter against rotation relative to the mount, an end plate for closing the second open end, a gasket retainer fixed to an end plate, an outer edge of the gasket retainer and the second open end forming a rolled seam for receiving the projecting lip, a structural adhesive between the projecting lip and the rolled seam, wherein the end plate includes a plurality of inlet holes and an outlet hole that is threaded to allow a conventional spin on attachment of the filter to a threaded stud on the filter mount.

21. The filter as recited in claim 20, wherein the lock ring comprises a circular opening which corresponds to a circular cross-section of the second end of the housing.

22. The filter as recited in claim 21, wherein the circular opening of the ring is formed by an inner wall including the projecting lip.

23. The filter as recited in claim 22, wherein the lock ring further comprises an outer perimeter including equally spaced projecting portions, in each projecting portion of which there is formed a hole which serves to receive a wire extending from a filter mount to the filter to lock the filter against rotation relative to the mount.

24. The filter as recited in claim 21, wherein the ring includes a plurality of holes extending from one surface of the ring to another surface of the ring for receiving respective wires extending from a filter mount to the filter to lock the filter against rotation relative to the mount, and a projecting lip extending circumferentially along an inner wall forming the circular opening.

25. A filter, comprising:
   a housing having a cylindrical side wall, a first, closed end and a second, open end, a filter media disposed in the housing for filtering fluid, a plastic lock ring attached to an exterior of the second end via a structural adhesive, wherein said lock ring includes a hole for receiving a wire extending from a filter mount to the filter to lock the filter against rotation relative to the mount, and an end plate attached to the second open end,
   wherein a plurality of inlet holes and an outlet hole that is threaded are formed in the end plate, and
   wherein the ring includes a projecting lip which cooperates with a seam formed at the filter second end.

26. The filter as recited in claim 25, wherein the plastic lock ring is injection molded of an acrylonitrile butadiene styrene resin.

27. The filter as recited in claim 25, wherein the lock ring further comprises an outer perimeter including equally spaced projecting portions, in each projecting portion of which there is formed a hole which serves to receive a wire extending from a filter mount to the filter to lock the filter against rotation relative to the mount.

28. The filter as recited in claim 25, wherein the filter further comprises a gasket retainer connected to the end plate, and an outer edge of the gasket retainer and the second end of the housing form the seam.

29. The filter as recited in claim 28, wherein said structural adhesive is disposed between the projecting lip and the rolled seam.

30. The filter as recited in claim 29, further comprising a gasket in the gasket retainer.

31. A spin-on filter assembly, comprising:
   a. a housing including a side wall, a first, closed end and a second, open end, a filter element disposed within the housing for filtering fluid, a plastic lock ring including a plurality of holes and being attached to an exterior of the second open end via a structural adhesive, an end plate attached to the second end and, formed in the end plate, a plurality of inlet holes and an outlet hole that is threaded, b. a filter mount including a threaded stud which cooperates with the threaded outlet hole, and a plurality of tie-downs to receive a wire that extends through each hole in the ring to lock the filter against rotation relative to the mount.

32. The filter assembly as recited in claim 31, wherein the lock ring comprises:

a circular opening which corresponds to a circular cross-section of the second end of the housing.

33. The filter assembly as recited in claim 32, wherein the circular opening of the ring is formed by an inner wall including the projecting lip.

34. The filter assembly as recited in claim 33, wherein the lock ring further comprises an outer perimeter including the plurality of holes which serves to receive the wire.

35. The filter assembly as recited in claim 31, further comprising a gasket retainer connected to the end plate, wherein an outer edge of the gasket retainer and the second end of the housing form the seam.

36. The filter assembly as recited in claim 35, wherein said structural adhesive is disposed between the projecting lip and the seam.

37. A filter, comprising:

a housing having a side wall, a first closed end and a second open end, an end plate for closing the second open end, a filter element disposed Within the housing for filtering fluid, wherein the second end includes a plastic lock ring attached to an exterior of the second, open end via a structural adhesive and, formed in the end plate, a plurality of inlet holes, and an outlet hole that is threaded to allow a conventional spin on attachment of the filter to a threaded stud on a filter mount, wherein the lock ring includes a circular opening which corresponds to a circular cross-section of the second end of the filter, wherein the circular opening of the ring is formed by an inner wall including a projecting lip which cooperates with a seam formed on the filter second end, and wherein the lock ring further includes an outer perimeter including equally spaced projecting portions, in each projecting portion of which there is formed a hole which serves to receive a wire extending from a filter mount to the filter to lock the filter against rotation relative to the mount.

38. The filter as recited in claim 37, wherein each projecting portion hole extends from one surface of the ring to another surface of the ring, and the projecting lip extends circumferentially along an inner wall forming the circular opening.

39. The filter as recited in claim 38, wherein the filter further comprises a gasket retainer connected to the end plate, and wherein an outer edge of the gasket retainer and a free end of the filter housing form a rolled seam which receives the projecting lip of the ring.

40. The filter as recited in claim 39, wherein said structural adhesive is disposed between the projecting lip and the rolled seam.

41. The filter as recited in claim 39, further comprising a gasket in the gasket retainer.

42. The filter as recited in claim 37, wherein the plastic lock ring is injection molded.

43. The filter as recited in claim 37, wherein the plastic is an acrylonitrile butadiene styrene resin.

44. A filter, comprising:

a cylindrical housing having a first closed end and a second open end, a filter element disposed within the housing for filtering fluid, an injection molded plastic ring attached to an exterior of the second end via a structural adhesive, a gasket retainer fixed to an end plate, said end plate including a plurality of inlet holes and an outlet hole that is threaded to allow a conventional spin on attachment of the filter to a threaded stud on a filter mount, wherein the lock ring includes a circular opening which corresponds to a circular cross-section of the second end of the housing, wherein the circular opening of the ring is formed by an inner wall including a projecting lip which cooperates with a seam formed at the housing second end, and wherein the lock ring further includes an outer perimeter including equally spaced projecting portions, in each projecting portion of which there is formed a hole which serves to receive a wire extending from a filter mount to the filter to lock the filter against rotation relative to the mount.

45. The filter as recited in claim 44, wherein the plastic is an acrylonitrile butadiene styrene resin.

46. A filter, comprising:

a cylindrical housing having a first closed end and a second open end, a filter element disposed within the housing for filtering fluid, an injection molded plastic lock ring attached to an exterior of the second end, a gasket retainer fixed to an end plate, said end plate including a plurality of inlet holes and an outlet hole that is threaded to allow a conventional spin on attachment of the filter to a threaded stud on a filter mount, wherein the plastic is an acrylonitrile butadiene styrene resin, wherein the lock ring includes a circular opening which corresponds to a circular cross-section of the second end of the housing, and wherein the ring includes a plurality of holes extending from one surface of the ring to another surface of the ring for receiving a wire, and a projecting lip extending circumferentially along an inner wall forming the circular opening.

47. The filter as recited in claim 46, wherein an outer edge of the gasket retainer, and the second end of the housing form a rolled seam which receives the projecting lip of the ring.

48. The filter as recited in claim 47, wherein said structural adhesive is disposed between the projecting lip and the rolled seam.

49. A filter, comprising:

a housing having a first closed end and a second open end, a filter element disposed within the housing for filtering fluid, an infection molded plastic lock ring having a projecting lip for attachment to an exterior of the second end, a gasket retainer fixed to an end plate, an outer edge of the gasket retainer and the second end forming a rolled seam for receiving the projecting lip, a structural adhesive between the projecting lip and the rolled seam, said end plate including a plurality of inlet holes and an outlet hole that is threaded to allow a conventional spin on attachment of the filter to a threaded stud on a filter mount, wherein the lock ring includes a circular opening which corresponds to a circular cross-section of the second end of the housing, wherein the circular opening of the ring is formed by an inner wall including the projecting lip, and wherein the lock ring further includes an outer perimeter including equally spaced protecting portions, in each projecting portion of which there is formed a hole which serves to receive a wire extending from a filter mount to the filter to lock the filter against rotation relative to the mount.

50. A filter, comprising:

a housing having a first closed end and a second open end, a filter element disposed within the housing for filtering fluid, an injection molded plastic lock having a projecting lip for attachment to an exterior of the second end, a gasket retainer fixed to an end plate, an outer edge of the gasket retainer and the second end forming a rolled seam for receiving the projecting lip, a structural adhesive between the projecting lip and the rolled seam, said end plate including a plurality of inlet holes and an outlet hole that is threaded to allow a conventional spin on attachment of the filter to a threaded stud on a filter mount, wherein the lock ring includes a circular opening which corresponds to a circular cross-section of the second end of the housing, and wherein the ring includes a plurality of holes extending from one surface of the ring to another surface of the ring for receiving a wire.

51. A filter, comprising:

a housing having a cylindrical side wall, a first closed end and a second open end, a filter media disposed within the housing for filtering fluid, a plastic lock ring attached to an exterior of the second end and an end plate attached to the second end via a structural adhesive, wherein a plurality of inlet holes and an outlet hole that is threaded are formed in the end plate, and wherein the ring includes a projecting lip which cooperates with a seam formed at the filter second end, wherein the lock ring further includes an outer perimeter including equally spaced projecting portions, in each projecting portion of which there is formed a hole which serves to receive a wire extending from a filter mount to the filter to lock the filter against rotation relative to the mount.

52. The filter as recited in claim 51, wherein the plastic lock ring is injection molded of an acrylonitrile butadiene styrene resin.

53. The filter as recited in claim 51, wherein the filter further includes a gasket retainer connected to the end plate, and an outer edge of the gasket retainer and the second end of the housing form the seam.

54. The filter as recited in claim 53, further comprising a gasket in the gasket retainer.

55. The filter as recited in claim 51, wherein said structural adhesive is disposed between the projecting lip and the rolled seam.

56. A spin-on filter assembly, comprising:

a. a filter having a housing, a side wall, a first closed end and a second open end, an end plate for closing the second open end, a filter element disposed within the housing for filtering fluid, a plastic lock ring including a plurality of holes and being attached to an exterior of the second end via a structural adhesive, an end plate attached to the second end and, formed in the end plate, a plurality of inlet holes and an outlet hole that is threaded, wherein the ring includes a projecting lip which cooperates with a seam formed at the second end; and b. a filter mount including a threaded stud which cooperates with the threaded outlet hole, and a plurality of tie-downs to receive a wire that extends through each hole in the ring to lock the filter against relative rotation with the mount.

57. The filter assembly as recited in claim 56, wherein the lock ring comprises:

a circular opening which corresponds to a circular cross-section of the second end of the housing.

58. The filter assembly as recited in claim 57, wherein the circular opening of the ring is formed by an inner wall including the projecting lip.

59. The filter assembly as recited in claim 58, wherein the lock ring further comprises an outer perimeter including the plurality of holes which serves to receive the wire.

60. The filter assembly as recited in claim 56, further comprising a gasket retainer connected to the end plate, wherein an outer edge of the gasket retainer and the second end of the housing form the seam.

61. The filter assembly as recited in claim 60, wherein said structural adhesive is disposed between the protecting lip and the seam.

\* \* \* \* \*